(12) United States Patent
Huang et al.

(10) Patent No.: US 7,751,081 B2
(45) Date of Patent: Jul. 6, 2010

(54) GAMUT MAPPING BY CONTROLLING MINIMUM AND MAXIMUM COLOR CHANGES

(75) Inventors: Xuan-Chao Huang, Lexington, KY (US); Anna Yaping Deer, Lexington, KY (US); Brant Dennis Nystrom, Lexington, KY (US); Richard Lee Reel, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 2132 days.

(21) Appl. No.: 10/403,944

(22) Filed: Mar. 31, 2003

(65) Prior Publication Data

US 2005/0073730 A1 Apr. 7, 2005

(51) Int. Cl.
*G03F 3/00* (2006.01)
*H04N 1/54* (2006.01)
*H04N 1/56* (2006.01)
*H04N 1/60* (2006.01)
*G09G 5/06* (2006.01)

(52) U.S. Cl. .............. 358/1.9; 358/3.23; 358/515; 358/518; 358/520; 358/523; 358/525; 345/589; 345/590; 345/591; 345/601; 345/602; 345/603; 345/604

(58) Field of Classification Search ............ 358/3.23, 358/1.9, 515, 520, 525, 518, 523; 345/589, 345/590, 591, 601–604
See application file for complete search history.

(56) References Cited

U.S. PATENT DOCUMENTS

| | | | | |
|---|---|---|---|---|
| 5,299,291 A | 3/1994 | Ruetz | | 395/109 |
| 5,438,649 A | 8/1995 | Ruetz | | 395/109 |
| 5,450,216 A | 9/1995 | Kasson | | 358/518 |
| 5,471,324 A | 11/1995 | Rolleston | | 358/518 |
| 5,500,921 A | 3/1996 | Ruetz | | 395/109 |
| 5,510,910 A | 4/1996 | Bockman et al. | | 358/502 |
| 5,563,724 A | 10/1996 | Boll et al. | | 358/502 |
| 5,596,428 A * | 1/1997 | Tytgat et al. | | 358/518 |
| 5,611,030 A | 3/1997 | Stokes | | 395/131 |
| 5,699,491 A | 12/1997 | Barzel | | 395/109 |
| 5,704,026 A | 12/1997 | Wan | | 395/131 |
| 5,710,824 A | 1/1998 | Mongeon | | 382/162 |
| 5,712,925 A | 1/1998 | Ohga | | 382/167 |
| 5,731,818 A | 3/1998 | Wan et al. | | 345/431 |
| 5,909,291 A | 6/1999 | Myers et al. | | 358/523 |
| 5,933,252 A | 8/1999 | Emori et al. | | 358/500 |
| 5,949,967 A | 9/1999 | Spaulding et al. | | 395/109 |
| 6,023,527 A | 2/2000 | Narahara | | 382/167 |
| 6,104,829 A | 8/2000 | Nakajima | | 382/167 |
| 6,198,843 B1 | 3/2001 | Nakauchi et al. | | 382/167 |

(Continued)

OTHER PUBLICATIONS

J. Morovic and M. R. Luo, Gamut Mapping Algorithms Based on Psychophysical Experiment, Proceedings of 5th IS&T/SID Color Imaging Conference, Scottsdale, pp. 44-49 (1997).

(Continued)

*Primary Examiner*—David K Moore
*Assistant Examiner*—Beniyam Menberu

(57) ABSTRACT

A method of gamut mapping includes the steps of defining a mapping function establishing a continuous first derivative of change of at least one color space component from a first color gamut to a second color gamut, and applying the function to first color gamut data for the at least one color space component.

24 Claims, 18 Drawing Sheets

U.S. PATENT DOCUMENTS

| | | | |
|---|---|---|---|
| 6,229,915 B1 | 5/2001 | Ohkubo | 382/167 |
| 6,266,165 B1* | 7/2001 | Huang et al. | 358/520 |
| 6,342,951 B1* | 1/2002 | Eschbach et al. | 358/1.9 |
| 6,359,703 B1 | 3/2002 | Yabe | 358/1.9 |
| 6,381,361 B1 | 4/2002 | Silverbrook et al. | 382/162 |
| 6,388,674 B1 | 5/2002 | Ito et al. | 345/590 |
| 6,400,843 B1 | 6/2002 | Shu et al. | 382/167 |
| 6,414,690 B1 | 7/2002 | Balasubramanian et al. | 345/589 |
| 6,421,142 B1 | 7/2002 | Lin et al. | 358/1.9 |
| 6,437,792 B1 | 8/2002 | Ito et al. | 345/600 |
| 6,720,973 B2* | 4/2004 | Butler | 345/604 |
| 6,724,500 B1* | 4/2004 | Hains et al. | 358/1.9 |
| 6,724,507 B1* | 4/2004 | Ikegami et al. | 358/518 |
| 6,750,992 B1* | 6/2004 | Holub | 358/504 |
| 6,873,439 B2* | 3/2005 | Levy et al. | 358/1.9 |
| 6,995,865 B1* | 2/2006 | Motomura | 358/1.9 |
| 6,995,870 B2* | 2/2006 | Holub | 358/1.9 |
| 7,116,441 B1* | 10/2006 | Matsuoka | 358/1.9 |
| 7,221,482 B2* | 5/2007 | Yamazaki et al. | 358/2.1 |
| 7,315,397 B2* | 1/2008 | Nishimura | 358/1.9 |
| 7,379,208 B2* | 5/2008 | Henley et al. | 358/1.9 |
| 7,557,814 B2* | 7/2009 | Tin | 345/590 |
| 2001/0013940 A1 | 8/2001 | Mayer et al. | 358/1.9 |
| 2002/0054307 A1* | 5/2002 | Matsuoka | 358/1.9 |
| 2002/0122190 A1 | 9/2002 | Harrington | 358/1.9 |
| 2002/0136445 A1 | 9/2002 | Haikin et al. | 382/162 |
| 2002/0163669 A1 | 11/2002 | Yamazaki et al. | 358/3.23 |
| 2003/0184565 A1* | 10/2003 | Georgiev | 345/646 |
| 2003/0223634 A1* | 12/2003 | Gallagher et al. | 382/167 |
| 2006/0119870 A1* | 6/2006 | Ho et al. | 358/1.9 |
| 2007/0052719 A1* | 3/2007 | Tin | 345/590 |
| 2007/0177175 A1* | 8/2007 | Matsuoka | 358/1.9 |
| 2007/0188780 A1* | 8/2007 | Edge | 358/1.9 |

OTHER PUBLICATIONS

G.J. Braun and M.D. Fairchild, General Purpose Gamut-Mapping Algorithms: Evaluation of Contrast-Preserving Re-scaling Functions for Color Gamut Mapping, Proceedings of 7$^{th}$ IS&T/SID Color Imaging Conference, Scottsdale, pp. 167-172 (1999).

* cited by examiner

GAMUT MAPPING BY CONTROLLING MINIMUM AND MAXIMUM COLOR CHANGES

BACKGROUND OF THE INVENTION

1. Field of the Invention

The present invention relates to an imaging apparatus, and, more particularly, to a method for mapping a source gamut to a destination gamut.

2. Description of the related art.

In recent years, the use of computers for home and business purposes has increased significantly. Most computer systems incorporate the use of a computer monitor and a printer. Users frequently display images on the computer monitor, including scanned images, photos downloaded from the internet, or from a digital camera, as well as images created or modified by the user with various application software products that are available to businesses and consumers alike. Users of ten wish to reproduce such images on a printer. However, the reproduced image may not satisfactorily represent the image as displayed on the computer monitor. This is because the color gamut of one system, such as a computer monitor or a scanner, is different than the color gamut of another system, such as a printer. For example, a computer monitor generally can produce a much larger gamut than a printer. To effectively reproduce computer monitor colors with a printer, gamut mapping must be performed, in which the out-of-gamut colors of the computer monitor are mapped into the printer gamut boundary. Various gamut-mapping methods have been proposed. However, because these methods do not provide an efficient control for changes of colors during gamut mapping, some printed colors experience "wash-out" due to over-compression of the gamut, and other colors will not transition smoothly, but rather will experience "blocking."

What is needed in the art is a gamut mapping method that effectively controls the change of colors from the source gamut to the destination gamut so as to reduce the wash-out and blocking of colors in the printed output.

SUMMARY OF THE INVENTION

The present invention provides an efficient gamut mapping method that controls the color changes during mapping so as to reduce the wash-out and blocking of colors in the printed output.

The invention comprises, in one form thereof, a method of mapping a first color gamut to a second color gamut, including the steps of defining a mapping function establishing a continuous first derivative of change of at least one color space component from the first color gamut to the second color gamut, and applying the function to first color gamut data for the at least one color space component.

The invention comprises, in another form thereof, an imaging system that employs a color reproduction table, wherein the color reproduction table effects a continuous first derivative of change of at least one color space component from a first color gamut to a second color gamut.

The invention comprises, in yet another form thereof, a method of mapping a first color gamut to a second color gamut, including the steps of determining an initial boundary mapping from a first gamut boundary of the first color gamut to a second gamut boundary of the second color gamut, and modifying the initial boundary mapping based on a general color change control scheme that maintains a continuous first derivative of change of lightness and chroma between the first color gamut and the second color gamut. The method also includes determining an internal lightness mapping of a lightness component of the first color gamut to a lightness component of the second color gamut based on the general color change control scheme that maintains a continuous first derivative of change of lightness and chroma between the first color gamut and the second color gamut, and determining an internal chroma mapping of a chroma component of the first color gamut to a chroma component of the second color gamut based on the general color change control scheme that maintains a continuous first derivative of change of lightness and chroma between the first color gamut and the second color gamut.

An advantage of the present invention is the ability to provide a smooth transition in mapping between a source gamut and a destination gamut.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
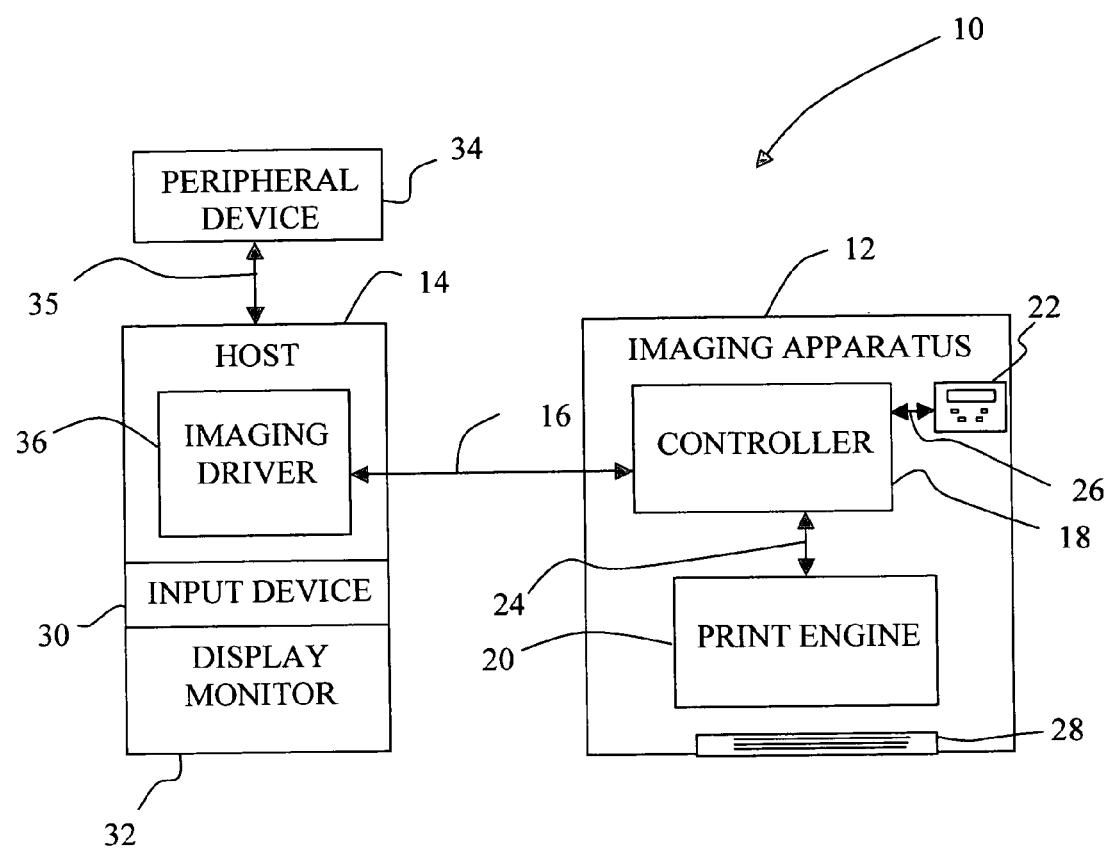
FIG. 1 is a diagrammatic depiction of an imaging system that utilizes the present invention.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

Imaging apparatus 12 can be, for example, an ink jet printer and/or copier, or an electrophotographic printer and/or copier. Imaging apparatus 12 includes a controller 18, a print engine 20 and a user interface 22.

Controller 18 includes a processor unit and associated memory, and may be formed as an Application Specific Integrated Circuit (ASIC). Controller 18 communicates with print engine 20 via a communications link 24. Controller 18 communicates with user interface 22 via a communications link 26.

In the context of the examples for imaging apparatus 12 given above, print engine 20 can be, for example, an ink jet print engine or a color electrophotographic print engine, configured for forming an image on a print medium 28, such as a sheet of paper, transparency or fabric.

Host 14 may be, for example, a personal computer including an input device 30, such as a keyboard, and a display monitor 32. A peripheral device 34, such as a scanner or a digital camera, is coupled to host 14 via a communication link 35. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 36, e.g., printer driver software, for imaging apparatus 12. Imaging driver 36 is in communication with controller 18 of imaging apparatus 12 via communications link 16. Imaging driver 36 facilitates communication between imaging apparatus 12 and host 14, and may provide formatted print data to imaging apparatus 12, and more particularly, to print engine 20. Alternatively, however, all or a portion of imaging driver 36 may be located in controller 18 of imaging apparatus 12.

Communications link 16 may be established by a direct cable connection, wireless connection or by a network connection, such as, for example, an Ethernet local area network (LAN). Communications links 24, 26 and 35 may be established, for example, by using standard electrical cabling or bus structures, or by wireless connection.

Figure 2:
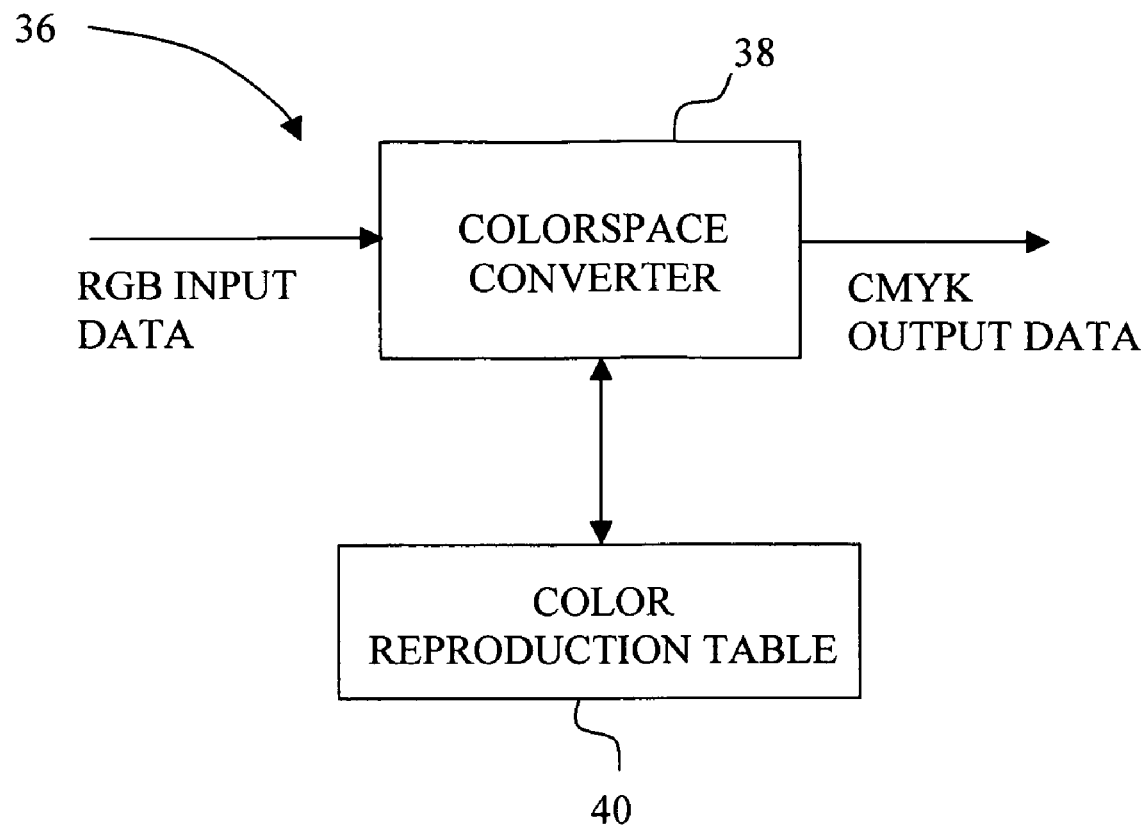
FIG. 2 is a diagrammatic depiction of a colorspace converter according to the present invention.

Referring now to FIG. 2, imaging driver 36 includes a colorspace converter 38. Although described herein as residing in imaging driver 36, colorspace converter 38 may be in the form of firmware or software, and may reside in either imaging driver 36 or controller 18. Alternatively, some portions of colorspace converter 38 may reside in imaging driver 36, while other portions reside in controller 18.

Coupled to colorspace converter 38 is a color reproduction table 40. Colorspace converter 38 is used for converting color signals from a first colorspace, such as an RGB colorspace, to a second colorspace, for example, CMYK. Color reproduction table 40 includes CMYK values and RGB values, wherein each CMYK value corresponds to an RGB value. As shown in FIG. 2, for example, colorspace converter 38 converts input RBG color data for the displayed image to CMYK output data that may be printed by print engine 20 by using color reproduction table 40.

Figure 3:
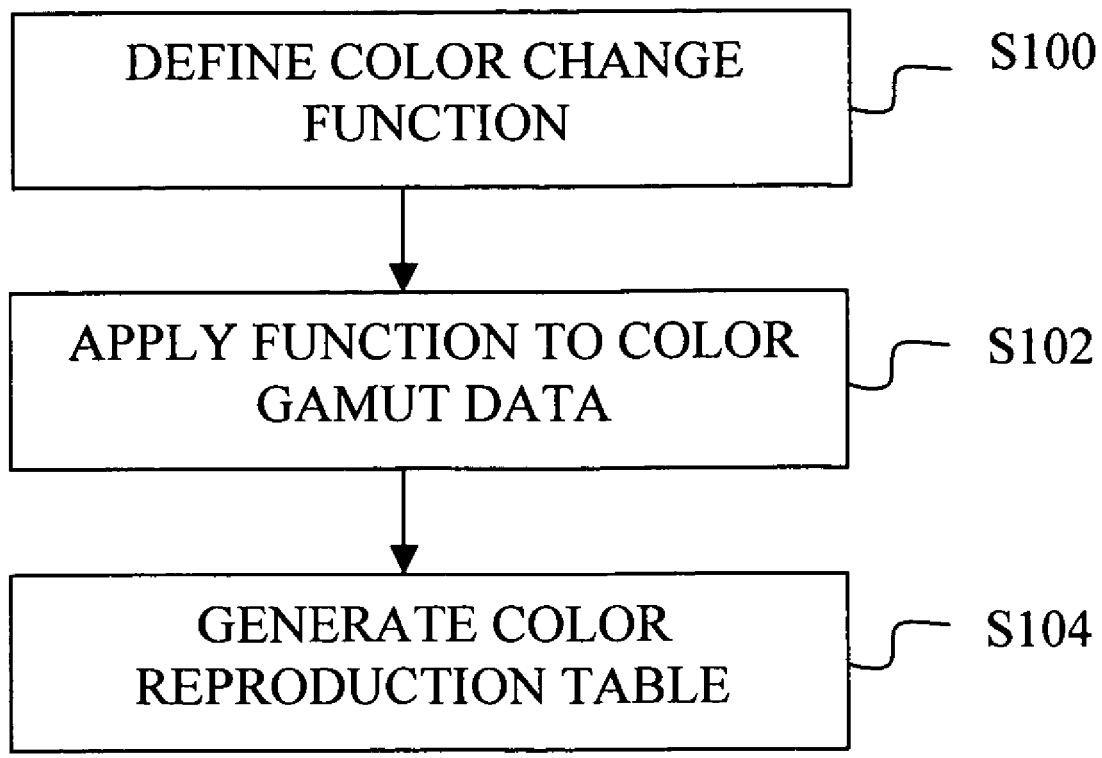
FIG. 3 is a flowchart depicting an overview of a method according to the present invention.

Referring now to FIG. 3, there is generally depicted a method according to the present invention of mapping a first color gamut, such as that pertaining to display monitor 32, to a second color gamut, such as that pertaining to imaging apparatus 12.

At step S100, a color change function is defined establishing a continuous first derivative of change of at least one color space component from the first color gamut to the second color gamut. The continuous first derivative may be, for example, a linear first derivative, although the continuous first derivative may be a constant first derivative, or a first derivative defined by any continuous function.

The function is further defined by a minimum first derivative of change of the at least one color space component from the first color gamut to the second color gamut, and a maximum first derivative of change of the at least one color space component from the first color gamut to the second color gamut. The at least one color space component includes a lightness L* component and a chroma C* component, such as those color components used in the CIELAB L*C*h* colorspace. In defining the function, for example, a first function is defined for mapping the lightness component from the first color gamut to the second color gamut, and a second function is defined for mapping the chroma component from the first color gamut to the second color gamut.

At step S102, the function is applied to first color gamut data for the color space component, such as by applying the first function to first color gamut lightness data, and by applying the second function to first color gamut chroma data. The steps of applying the first function and the second function include first determining an initial boundary mapping from a first gamut boundary of the first color gamut to a second gamut boundary of the second color gamut, and modifying the initial boundary mapping based on the function.

In determining the initial boundary mapping, a first color gamut lightness range is mapped to a second color gamut lightness range to generate a linear-lightness-scaled source gamut. The linear-lightness-scaled source gamut is then divided into a first plurality of hue-leafs. The second color gamut is divided into a second plurality of hue-leafs. Minimum error mapping is then performed from the linear-lightness-scaled source gamut to the second color gamut by mapping between each hue-leaf of the first plurality of hue-leafs and each of corresponding hue-leafs of the second plurality of hue leafs. The step of performing minimum error mapping is applied to both linear-lightness-scaled source gamut lightness data and linear-lightness-scaled source gamut chroma data.

Also, an internal lightness mapping of an internal lightness component of the first color gamut to an internal lightness component of the second color gamut is determined, for example, based on the first function established in step S100, and an internal chroma mapping of an internal chroma component of the first color gamut to an internal chroma component of the second color gamut is determined based on the second function established in step S100.

At step S104, a color reproduction table, such as color reproduction table 40, is generated. In generating the color reproduction table, the results of steps S100 and S102 are stored for access by colorspace converter 38 in converting color signals, for example, from RGB data to, for example, CMYK printer data, in order that an image displayed on display monitor 32 may be appropriately reproduced by imaging apparatus 12.

Figure 4:
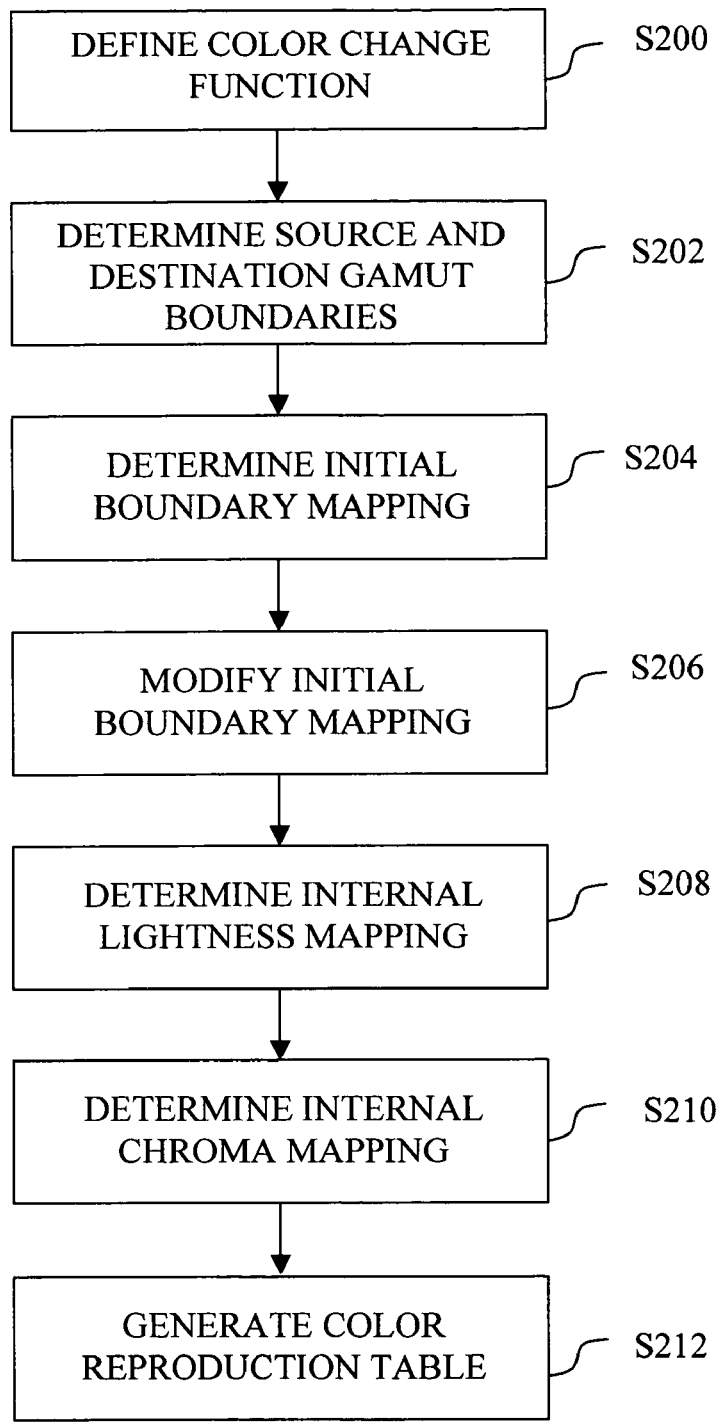
FIG. 4 is a flowchart depicting one method according to the present invention.

Steps S100 through S104 are explained in greater detail with reference to the flowchart of FIG. 4.

In performing gamut mapping according to the present invention, the destination gamut remains unchanged, and the out-of-gamut colors in the source gamut, i.e., display monitor 32, are mapped into the destination gamut, i.e., the color gamut of imaging apparatus 12. The method may be broken into several steps, as follows: step S200, define a general color change control function; step S202, determine source and destination gamut boundaries; step S204, determine an initial boundary mapping; step S206 modify the initial boundary mapping; step S208, determine an internal lightness mapping; step S210, determine an internal chroma mapping; and step S212, generate color reproduction table 40 based on the various mappings of steps S204, S206, S208 and S210.

Each of the above steps is explained in detail below with respect to FIG. 5. In practicing the mapping method of the present invention the source gamut 42 and the destination gamut 44 are first converted to a device independent color space, such as the CIELAB cylindrical system, L*C*h*. Here, L* is lightness, C* is chroma, and h* is hue angle. After performing the mapping process, the gamuts are converted back to the RGB and CMYK device dependent color spaces for entry into color reproduction table 40.

Figure 5:
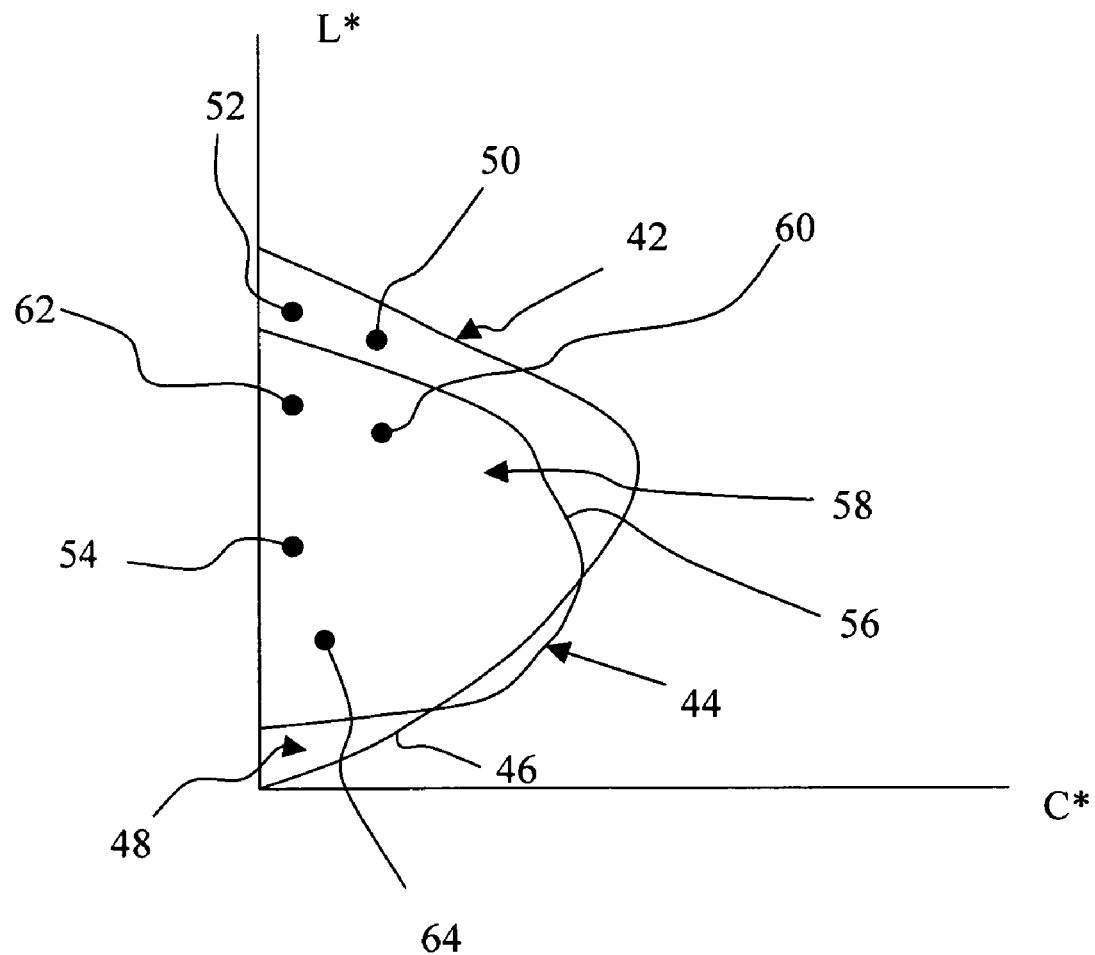
FIG. 5 is a graphical representation of a source color gamut and a destination color gamut.

Referring to FIG. 5, the device dependent colorspace of display monitor 32 is depicted as a device independent source gamut in the CIELAB L*C*h* color space, here, source gamut 42. In addition the device dependent colorspace of imaging apparatus 12 is depicted as a device independent destination gamut in the CIELAB L*C*h* color space, here, destination gamut 44. Source gamut 42 includes a source gamut boundary 46, inside of which is an internal source gamut 48 represented by a plurality of color values, such as those represented by color point 50, color point 52, and color point 54. Destination gamut 44 includes a destination gamut boundary 56, inside of which is an internal destination gamut 58 represented by a plurality of color values, such as those represented by color point 60, color point 62, and color point 64. In practicing the present invention method, for example, source gamut 42 is mapped into destination gamut 44.

Referring back to FIG. 4, at step S200, a general color change control function is defined. In defining the function, consideration is given to the fact that, in gamut mapping, the hue angle is normally unchanged, and the lightness and chroma data are mapped from source gamut 42 to destination gamut 44. Derivation of the function follows, in with reference to variables x and y, wherein x pertains to input lightness or chroma from source gamut 42, and y pertains output lightness or chroma for destination gamut 44.

Figure 6:
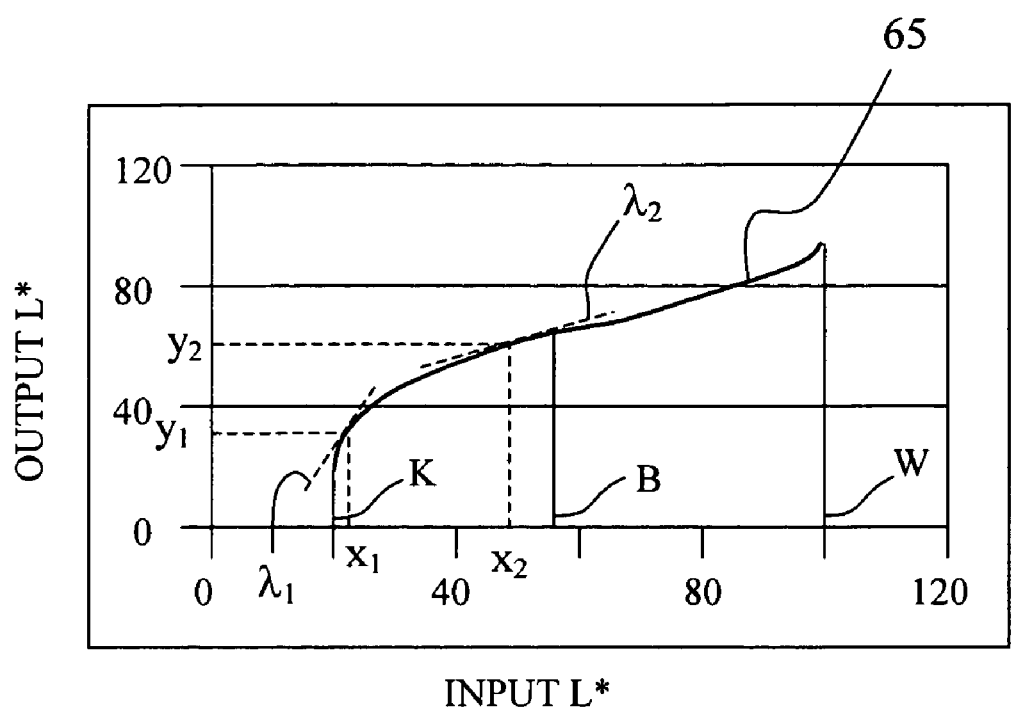
FIG. 6 is an example plot of input lightness vs. output lightness that is used as an aid in describing a derivation of a mapping function of the present invention.

Referring now to FIG. 6, a plot of input lightness vs. output lightness is provided as an aid in explaining the following derivation of a mapping function. As illustrated in FIG. 6, example curve 65 represents a relationship between input lightness, i.e., from a source gamut, and output lightness, i.e., for a destination gamut. The variables, $x_1$ and $x_2$ pertain to two arbitrary input lightness values, while the variables, $y_1$, and $y_2$, pertain to corresponding output lightness values. The variables, $\lambda_1$, and $\lambda_2$ pertain to the first derivative, dy/dx, at $x_1$ and $x_2$, respectively, represented by the slopes of the corresponding dashed lines of FIG. 6.

In order to ensure that the output changes smoothly, the function y=f(x) will have a continuous first derivative.

Let $$\lambda = \frac{dy}{dx} \quad \text{(First derivative - output changing rate at } x\text{)} \quad \text{Equation 1}$$

$$\lambda_1 = \left(\frac{dy}{dx}\right)_{x_1} \quad \text{(First derivative at } x_1\text{)} \quad \text{Equation 2}$$

$$\lambda_2 = \left(\frac{dy}{dx}\right)_{x_2} \quad \text{(First derivative at } x_2\text{)} \quad \text{Equation 3}$$

$$\lambda_a = \frac{y_2 - y_1}{x_2 - x_1} \quad \text{(Average output changing rate from } x_1 \text{ to } x_2\text{)} \quad \text{Equation 4}$$

The output changing rate varies linearly from $x_1$ to $x_2$, that is, $$\frac{dy}{dx} = ax + b \quad \text{Equation 5}$$

where a and b are constants. Using the boundary values at $x_1$ and $x_2$ for Equation 5 yields:

$$\frac{dy}{dx} = \lambda_1 + \frac{\lambda_2 - \lambda_1}{x_2 - x_1}(x - x_1). \quad \text{Equation 6}$$

Integrating Equation 6 yields Equation 7, as follows:

$$y = \lambda_1 x + \frac{\lambda_2 - \lambda_1}{2(x_2 - x_1)}(x - x_1)^2 + c \quad \text{Equation 7}$$

where c is a constant. Since $y=y_1$ when $x=x_1$, Equation 8 becomes:

$$c = y_1 - \lambda_1 x_1 \quad \text{Equation 8}$$

Substituting Equation 8 into Equation 7 yields Equation 9, as follows:

$$y = y_1 + \lambda_1(x - x_1) + \frac{\lambda_2 - \lambda_1}{2(x_2 - x_1)}(x - x_1)^2. \quad \text{Equation 9}$$

Equation 9 provides a function that establishes a continuous first derivative of change of at least one color space component from source gamut 42 to destination gamut 44, and will be used in subsequent steps S206, S208, and S210 in mapping source gamut 42 to destination gamut 44.

In the method of the present invention the function embodied in Equation 9 is further defined by a minimum first derivative of change of the at least one color space component from source gamut 42 to destination gamut 44, and by a maximum first derivative of change of the at least one color space component from source gamut 42 to destination gamut 44. The maximum and minimum first derivatives of change are derived below.

Since $y=y_2$ when $x=x_2$, we also have from Equation 7, $$c' = y_2 - \frac{\lambda_1}{2}(x_1 + x_2) - \frac{\lambda_2}{2}(x_2 - x_1).$$ Equation 10

Because the constant c in Equation 7 must satisfy both conditions at $x_1$ and $x_2$, $c=c'$. Therefore, Equation 11 is obtained from Equations 8 and 10, as follows:

$$\frac{\lambda_1 + \lambda_2}{2} = \frac{y_2 - y_1}{x_2 - x_1}.$$ Equation 11

The right side of Equation 11 is the average output changing rate, $\lambda a$, from input $x_1$ to $x_2$ (Equation 4). Comparing Equations 4 & 11, Equations 12 and 13 are given as follows:

$$\lambda_1 = 2\lambda_a - \lambda_2$$ Equation 12 or $$\lambda_2 = 2_a - \lambda_1$$ Equation 13

Because the output changing rate is proposed to change linearly from input $x_1$ to $x_2$, one of the changing rates, $\lambda_1$, $\lambda_2$, will be the minimum changing rate, $\lambda_{min}$, and the other will be the maximum changing rate, $\lambda_{max}$. That is, $$\lambda_{min} = \min(\lambda_1, \lambda_2) \text{ in domain } [x_1, x_2]$$ Equation 14 and $$\lambda_{max} = \max(\lambda_1, \lambda_2) \text{ in domain } [x_1, x_2].$$ Equation 15

Thus, according to Equations 12-15, Equation 16 is determined as follows:

$$\lambda_{min} = 2\lambda_a - \lambda_{max}$$ Equation 16

In applying Equation 16, the average changing rate ($\lambda_a$) is calculated using Equation 4. The maximum changing rate, $\lambda_{max}$, is then determined. The output, y, should be monotonically changed with the input, that is, $\lambda_a$, $\lambda_{min}$, and $\lambda_{max}$ should have the same sign, i.e., either negative or positive. Thus, the maximum changing rate will be controlled to be in the range from $\lambda_a$ to $2\lambda_a$. The minimum changing rate, $\lambda_{min}$, is then calculated using Equation 16. In addition, a determination must be made as to which of the two points, ($x_1$, $x_2$) should have a maximum changing rate so that $\lambda_{min}$ and $\lambda_{max}$ can be assigned to $\lambda_1$ and $\lambda_2$ in Equation 9. The output color values for destination gamut 44 are then calculated using Equation 9 for each color point in source gamut 42.

At step S202, the source and destination gamut boundaries are determined. Referring again to FIG. 5, source gamut boundary 46 is determined empirically as follows: for each of the red, green, and blue axes of the RGB source gamut 42, 17 equally-spaced points across the entire range are selected, and a cube is formed with a total of 4913 (17×17×17) grids. A standard monitor model can be used to compute the CIELAB L*C*h* values for each grid. The L*C*h* values of the surface grids on the 6 faces of the cube will contribute to the monitor gamut boundary. In FIG. 5, lightness L* is represented by the vertical axis, chroma C* is represented along the horizontal axis, and hue h* is an angle of a vector rotating around the L* axis.

Then, destination gamut boundary 56 is then determined empirically as follows: for each of the cyan, magenta, and yellow axes of the CMYK destination gamut 44, 17 equally-spaced points across the entire range are selected, and a cube is formed with a total of 4913 (17×17×17) grids. Each grid is then appropriately mixed with black using a black mixing method. The C, M, Y, and K values of each grid are then sent to a printer to print out a color patch. Each patch is measured for CIELAB L*C*h* values with a spectrophotometer. The L*C*h* values of the surface grids on the 6 faces of the cube will contribute to the printer gamut boundary.

Although more than four inks may be used in imaging apparatus 12, the present embodiment uses four inks. If more than four inks are to be used, then each of the grids should be appropriately mixed with other inks to send to the printer for the L*C*h* calibration.

Each of the L*C*h* spaces is then divided into grid points in the same increments, i.e., $\Delta L^* = 1.0$, $\Delta h^* = 2.0°$. For each point (L*, h*), the maximum chroma is selected as the boundary chroma ($C^*_b$). Thus, the gamut boundary may be described by a two-variable function: $C^*_b = f(L^*, h^*)$. For those gamut boundary points without empirical data, interpolation will be used to find their boundary chroma values.

At step S204, initial boundary mapping is determined. The boundary mapping affects the subsequent internal lightness and chroma mapping steps, and must therefore be performed appropriately. For example, if the source gamut boundary 46 were mapped destination gamut boundary 56 simply by linear scaling, the light colors in an image printed by imaging apparatus 12 might exhibit wash-out, because the destination gamut 44 chroma range is typically much smaller than that of the source gamut 42 toward the white end of the lightness L* axis. The linear mapping would thus result in the source gamut 42 chroma range being over-compressed. Accordingly, the method of the present invention employs a two-step boundary mapping method. Initially, a minimum error method is used to find the initial lightness and chroma mapping for the gamut boundary points. Then, Equation 9 is employed to ensure a continuous first derivative of change in modifying the initial lightness mapping.

Figure 7:
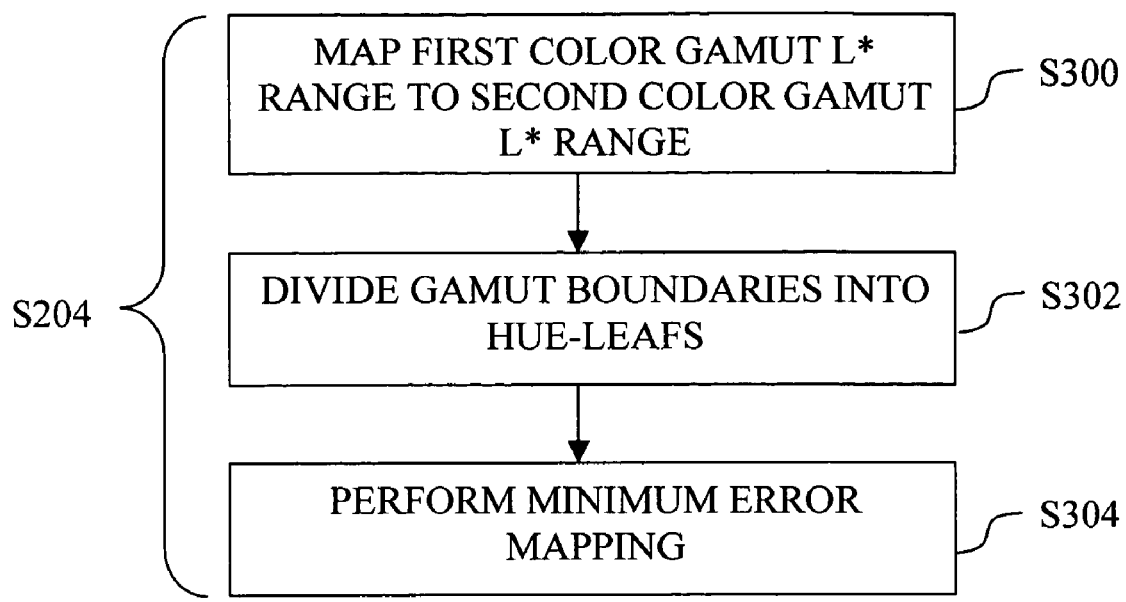
FIG. 7 is a flowchart depicting detailed steps of the FIG. 4 step of determining an initial boundary mapping.

Referring now to FIG. 7, there is shown a flowchart depicting detailed steps of method step S204.

At step S300, the source color gamut lightness range is mapped to the destination color gamut lightness range. Because the color gamut of a monitor, such as display monitor 32, is typically larger than the color gamut of a printer, this step essentially reduces the size of source gamut 42 along the L* axis to have the same range of lightness as destination gamut 44. This initial mapping is performed by linearly scaling the lightness of all color points within source gamut 42, in which the black and white points in source gamut 42 are changed to be the same as the black and white points of destination gamut 44. By performing the initial mapping, source gamut 42 is now a linear-lightness-scaled source gamut. All subsequent mapping operations will be performed using the linear-lightness-scaled source gamut, rather than the original source gamut 42.

Figure 8:
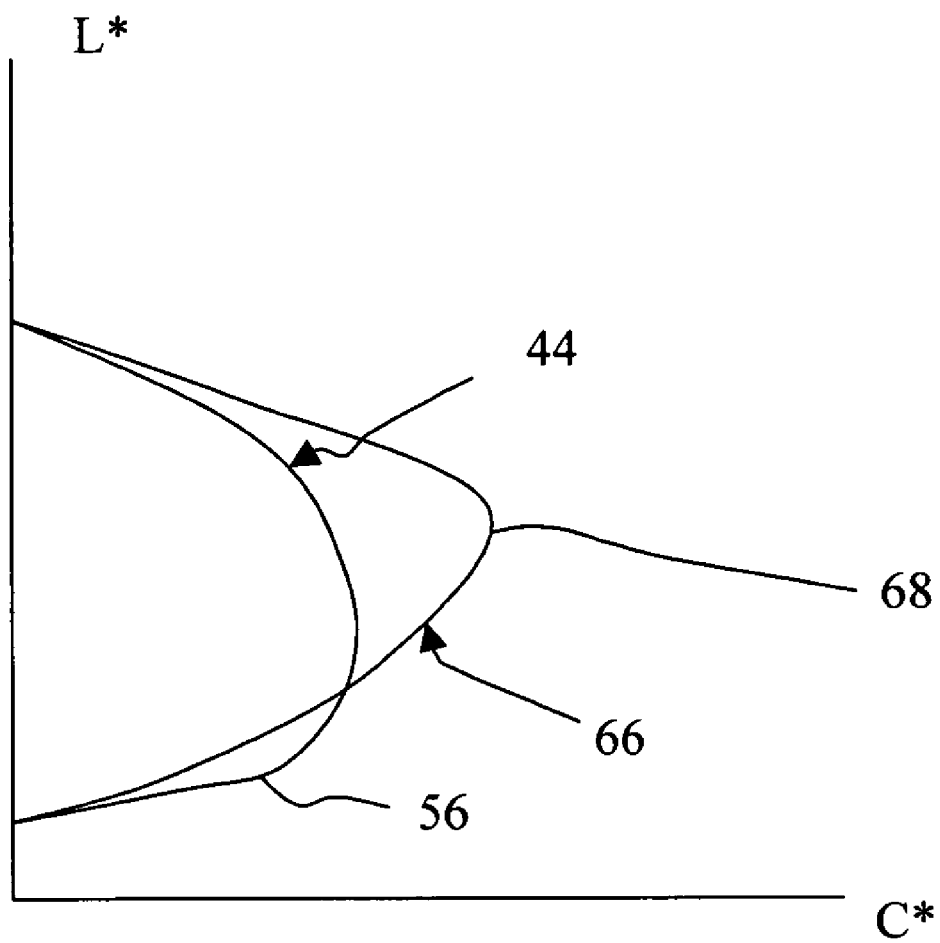
FIG. 8 is a graphical representation of a linear-lightness-scaled source gamut and a destination color gamut after mapping the source gamut lightness range to the destination gamut lightness range.

Referring now to FIG. 8, a linear-lightness-scaled source gamut 66 representing source gamut 42 is depicted, along with destination color gamut 44. It is apparent in FIG. 8 that the lightness range (on the L* axis) of both destination gamut 44 and linear-lightness-scaled source gamut 66 is the same.

Referring back to FIG. 7, at step S302, the gamut boundary is divided into hue-leafs, in order to speed-up the computation.

Figure 9:
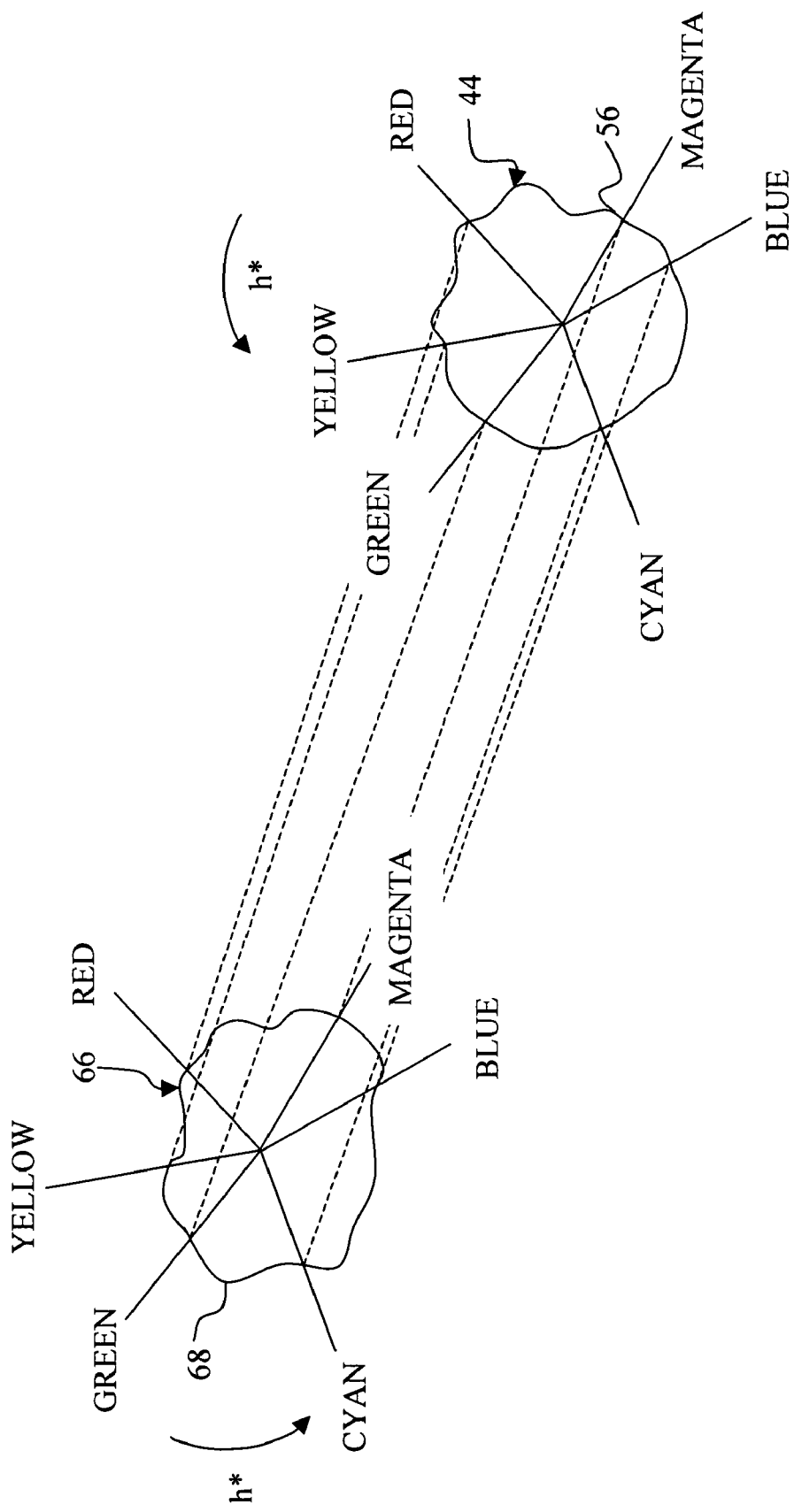
FIG. 9 is a graphical representation depicting an initial mapping of a linear-lightness-scaled source gamut boundary to the destination gamut boundary.

Referring now to FIG. 9, an initial mapping of a linear-lightness-scaled source gamut boundary 68 to destination gamut boundary 56 along selected hue angles is depicted. Here, six hue-leafs, along the hue angles of the primary colors, red, green, and blue; and secondary colors, cyan, magenta, and yellow, are determined. The initial boundary mapping is performed on the boundary points at each hue leaf.

Referring back to FIG. 7, at step S304, minimum error mapping is performed. The color error between two color points is described by the spatial distance between the two points. The closest two points will give the minimum color error. Accordingly, for each given source boundary point, the closest destination boundary point is used in the initial mapping. The lightness and chroma of the closest point will be assigned to the source point as initial mapped values, while keeping the hue angles unchanged.

Referring back to FIG. 4, at step S206, the initial boundary mapping is modified using Equation 9 to ensure a continuous first derivative of change between linear-lightness-scaled source gamut 66 and destination gamut 44.

Figure 10:
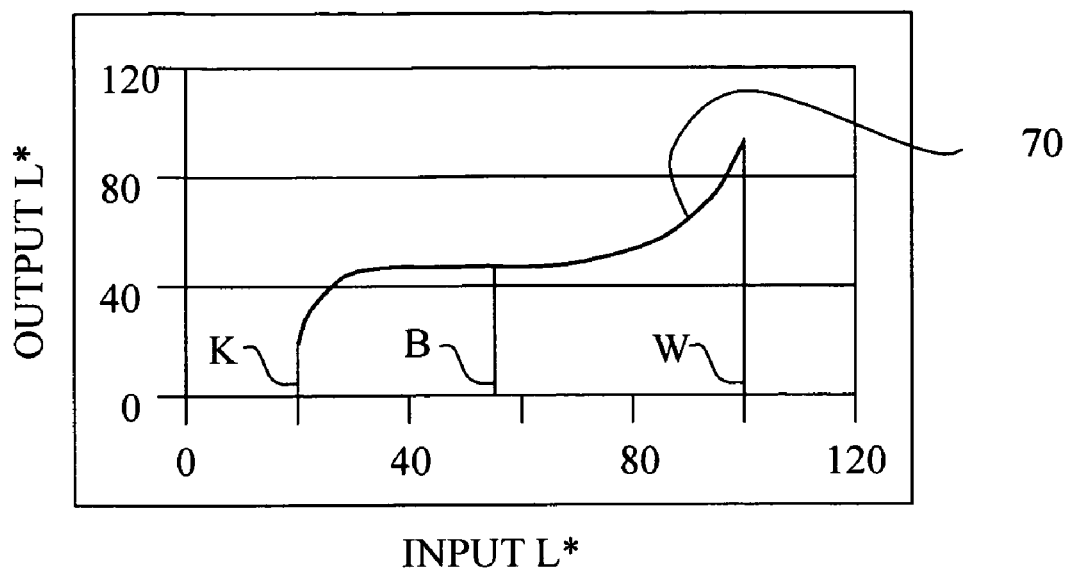
FIG. 10 is a plot depicting an initial mapped lightness from black to white for a blue hue-leaf.

Referring now to FIG. 10, an initial mapped lightness curve 70 from black to white for a blue hue-leaf is depicted. It can be seen from initial mapped lightness curve 70 that different source lightness values have been mapped to approximately the same destination lightness values. For example, in the relatively flat portion of initial mapped lightness curve 70, the output lightness, i.e., that intended for destination gamut 44, varies only slightly with respect to input lightness, i.e., the lightness components from linear-lightness-scaled source gamut 66. This would result in blocking in an image printed by imaging apparatus 12. Accordingly, the initial boundary mapping is modified, as set forth below.

Step S206 is described in greater detail with reference to FIG. 11.

Figure 11:
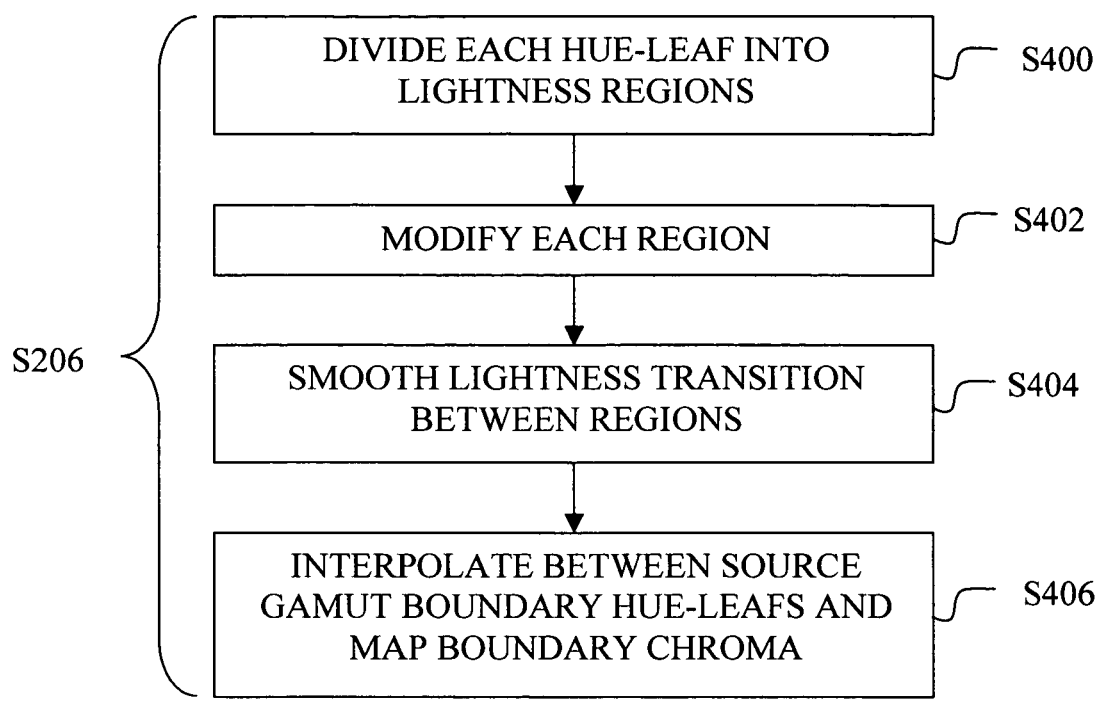
FIG. 11 is a flowchart depicting detailed steps of the FIG. 4 step of modifying an initial boundary lightness mapping.

Referring now to FIG. 11, a flowchart depicting detailed steps in modifying the initial boundary mapping is illustrated.

At step S400, each hue leaf is divided into lightness regions. Experience has shown that mapping the dark and light regions differently provides better image quality from imaging apparatus 12.

Referring again to FIG. 10, the region from the black to the primary or secondary color is defined as the dark region, and the region from the primary or secondary color to the white is defined as the light region. Here, region KB is the dark region, extending from the black point, K, to the blue point, B, where the blue point is defined as that point in the plot having the most chroma. Region BW is the light region extending from the blue point to the white point, W.

Referring back to FIG. 11, at step S402, each dark and light region is modified using Equation 9. The modification includes determining the average lightness changing rate, $\lambda_a$, with Equation 4, with input, x, representing the linear-lightness-scaled source gamut boundary 68 lightness (see FIG. 8), and with y representing the final mapped lightness. Next, the maximum lightness changing rate, $\lambda_{max}$, between two neighboring points in the initial boundary mapping is found, and set into the range:

$$\lambda_a \leq \lambda_{max} \leq 1.75\lambda_a.$$  Equation 17

Then, the minimum lightness changing rate, $\lambda_{min}$, is determined with Equation 16. The maximum changing rate, $\lambda_{max}$, is then assigned to the start or ending point, whichever is closer to the $\lambda_{max}$ point in the region, and the minimum changing rate ($\lambda_{min}$) is assigned to the remaining point. For example, in the dark region KB of FIG. 10, the $\lambda_{max}$ point occurs near the black point K, so at black point K, $\lambda_1 = \lambda_{max}$, and $\lambda_2 = \lambda_{min}$ at the blue point B. Finally, the modified source lightness, y, is calculated with Equation 9.

At step S404, the lightness transition between the dark regions and the light regions is smoothed.

Referring again to FIG. 10, at the transition point, which is the blue point B, the left and right changing rates are normally different. To ensure smoothness, a running average scheme is used, starting from the middle of the dark region, and ending at the middle of the light region BW. The running length can be taken as approximately 5% of the black-to-white region.

Figure 12:
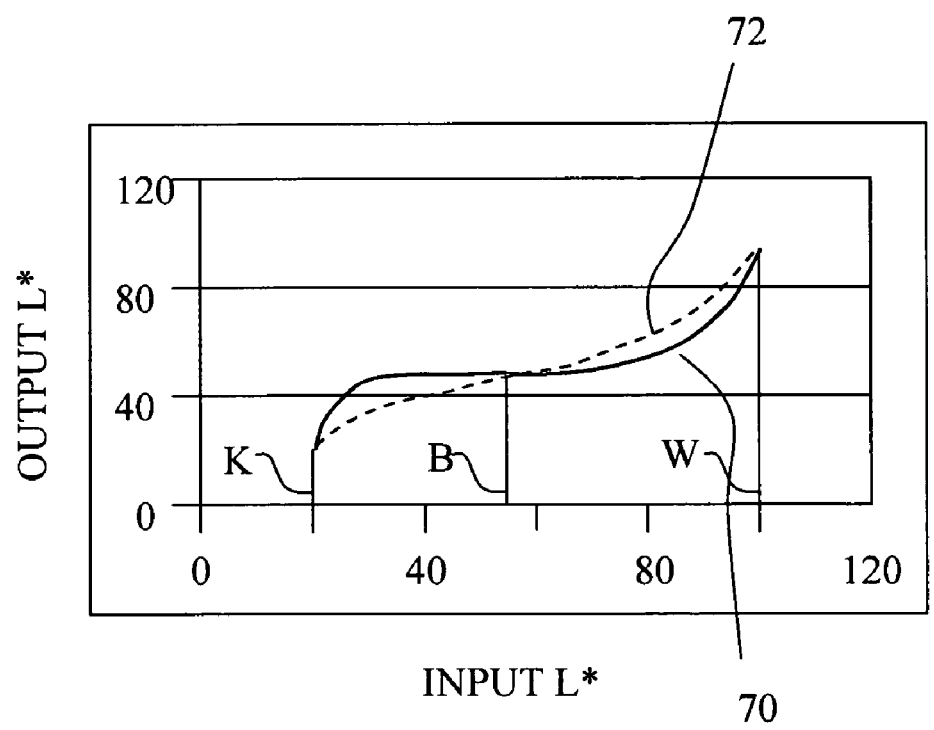
FIG. 12 depicts the result of modifying the initial boundary lightness mapping, along with the initial mapped lightness of FIG. 10.

Referring now to FIG. 12, the result of the modified boundary lightness mapping on the blue hue-leaf is shown by modified mapped lightness curve 72, along with the initial mapped lightness curve 70, depicted in FIG. 10.

Referring back to FIG. 11, at step S406, interpolation of lightness points between hue-leafs of linear-lightness-scaled source gamut boundary 68 is performed. The mapped lightness points will be linearly interpolated to other boundary points at other hue angles taking the hue angle difference as weight. As a result, at a given hue angle, a linear-lightness-scaled source gamut boundary 68 point has been mapped to a final lightness. The chroma of a destination gamut boundary 56 point that has the same hue angle and lightness as the linear-lightness-scaled source gamut boundary 68 point will be the mapped chroma of the linear-lightness-scaled source gamut boundary 68 point.

Referring back to FIG. 4, at step S208, internal lightness mapping is performed. Internal lightness mapping is performed in order to map the lightness of each point in the internal source gamut 48 to the lightness of each corresponding point in the internal destination gamut 58 (see FIG. 5).

Figure 13:
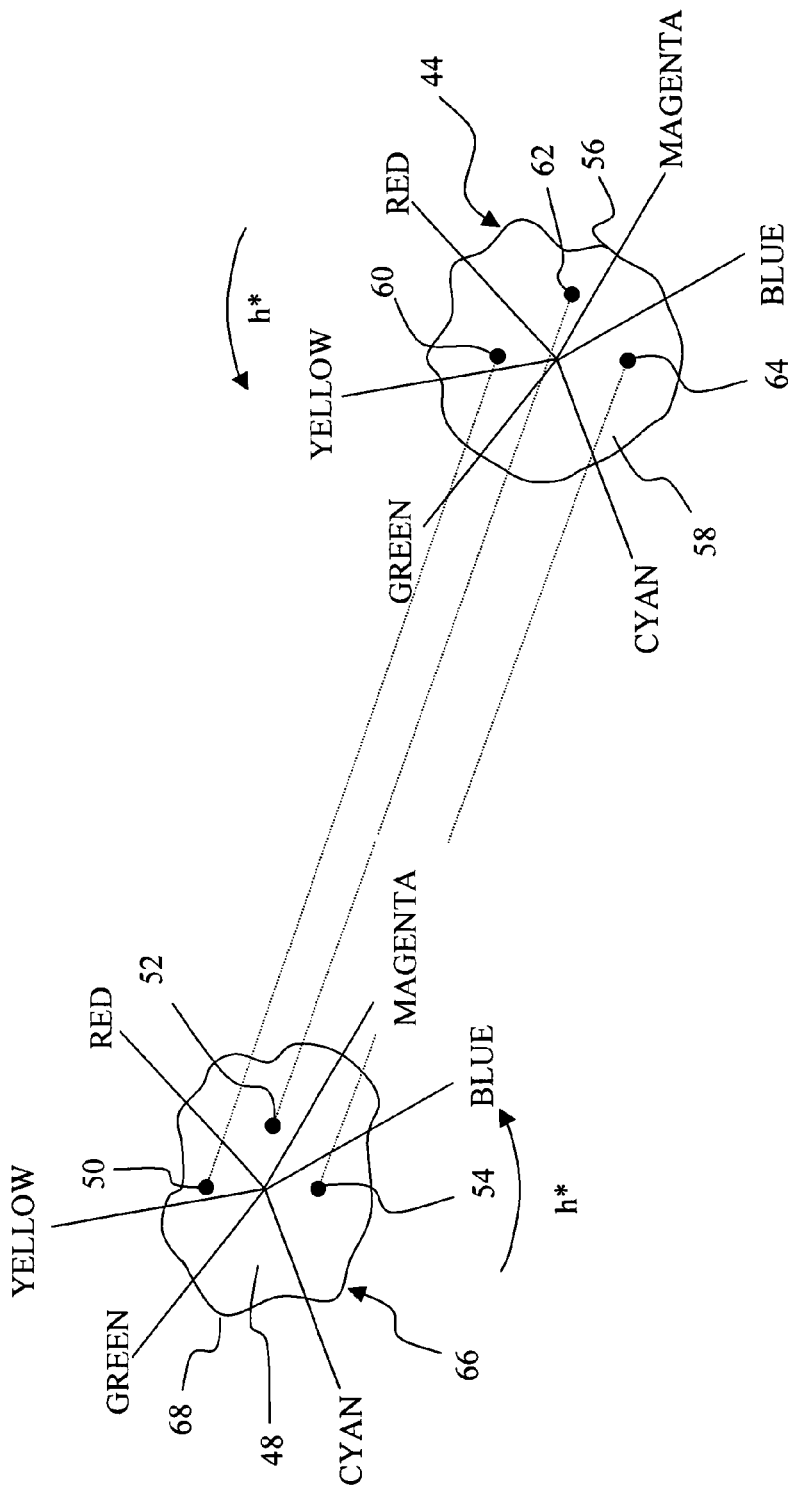
FIG. 13 is a graphical representation depicting an internal mapping of a linear-lightness-scaled source gamut to the destination gamut.

Referring now to FIG. 13, internal mapping of linear-lightness-scaled source gamut 66 to destination gamut 44 is depicted. The mapping is illustrated in FIG. 13 by mapping each point in internal source gamut 48, such as those represented by color point 50, color point 52, and color point 54 to each corresponding point in destination gamut 44, such as those represented by color point 60, color point 62, and color point 64.

Figure 14:
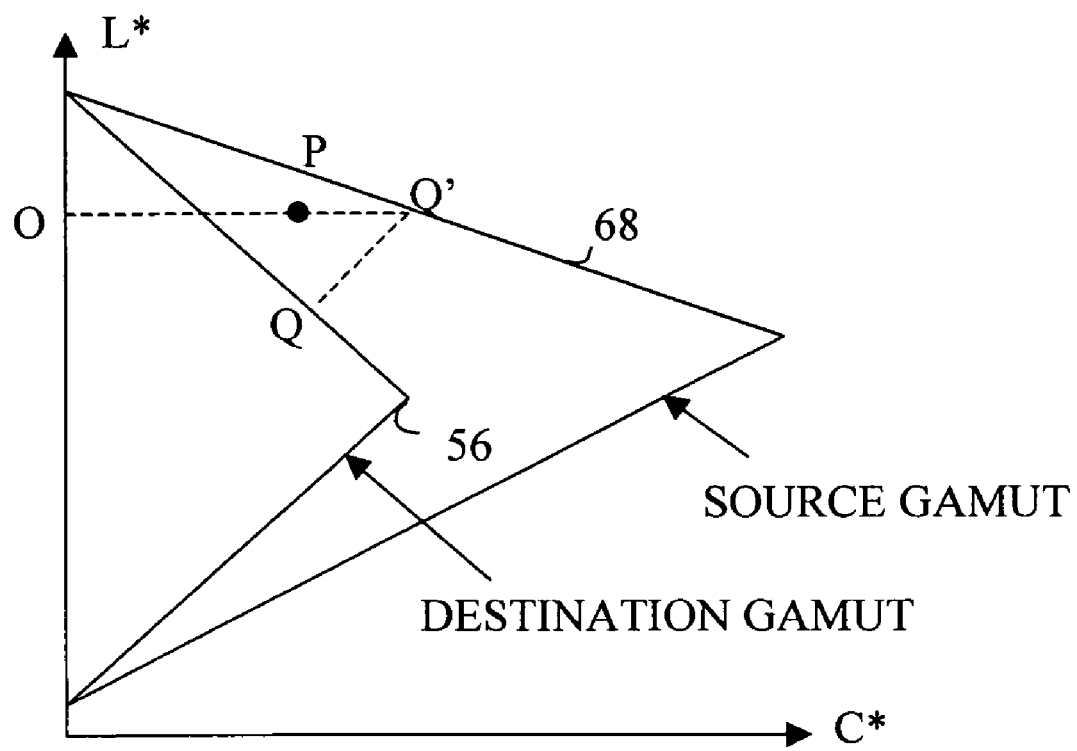
FIG. 14 depicts a plot illustrating internal lightness mapping.

Referring now to FIG. 14, a second view depicting internal lightness mapping is illustrated. As shown in FIG. 14, point Q' on linear-lightness-scaled source gamut boundary 68 is depicted as having been mapped to point Q on destination gamut boundary 56 according to step S204 and step S206. Here, linear-lightness-scaled source gamut 66 internal point O on the L* axis and point P between point O and Q'have the same linear-scaled lightness as point Q'. In step S208, all internal points are mapped from linear-lightness-scaled source gamut 66 to internal destination gamut 58 using Equation 9. Here, the input x is chroma and the output y is lightness. On the L* axis, the lightness is linear-scaled lightness and will be unchanged due to the fact that the linear mapping generally works well for gray scale images. Therefore, when x changes from $x_1 = 0$ (chroma=0 at L* axis) to $x_2 = C^*_{Q'}$ (chroma at point Q'), the lightness y will change from $y_1 = L^*_O$ (or $L^*_{Q'}$, linear-scaled lightness) to $y_2 = L^*_Q$ (final mapped boundary lightness).

Figure 15:
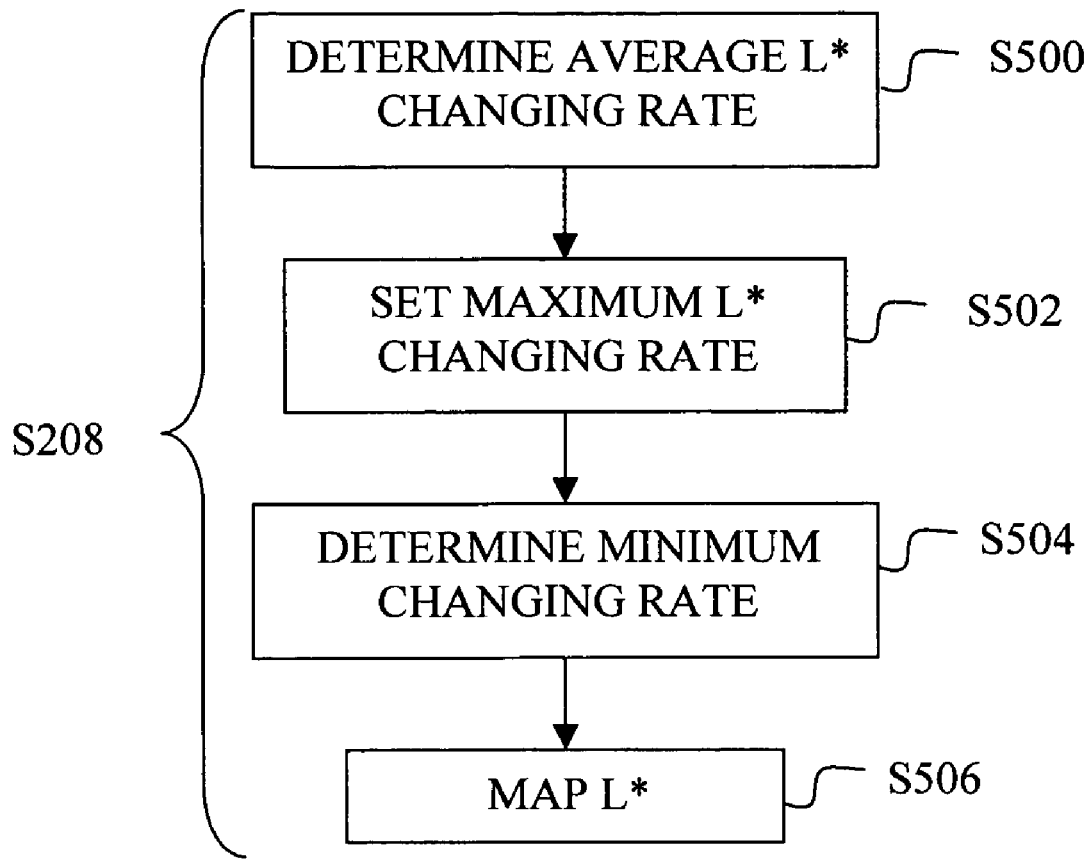
FIG. 15 is a flowchart depicting detailed steps of the FIG. 4 step of determining an internal lightness mapping.

Step S208 is described in greater detail with respect to FIG. 15.

Referring now to FIG. 15, a flowchart depicting detailed steps of determining internal lightness mapping is illustrated. At step S500, the average lightness L* changing rate, $\lambda_a$, is determined with Equation 4. Then, at step S502, the maximum lightness L* changing rate, $\lambda_{max}$, between two neighboring points is set as follows:

$$\lambda_{max} = 1.5\lambda_a.$$  Equation 18

At step S504, the minimum changing rate $\lambda_{min}$ is determined with equation 16.

At step S506, internal lightness L* is mapped from linear-lightness-scaled source gamut 66 to internal destination gamut 58. The maximum changing rate, $\lambda_{max}$, is assigned to the ending point at $x_2$, and the minimum changing rate, $\lambda_{min}$, is assigned to the starting point at $x_1$, because changing the lightness at a lower rate, such as $\lambda_{min}$, near the neutral line would preserve more of the original colors in an image displayed on display monitor 32. Then, the final lightness, y, of point P, i.e., with $x=C^*_P$, the chroma at point P, is determined with Equation 9.

Figure 16:
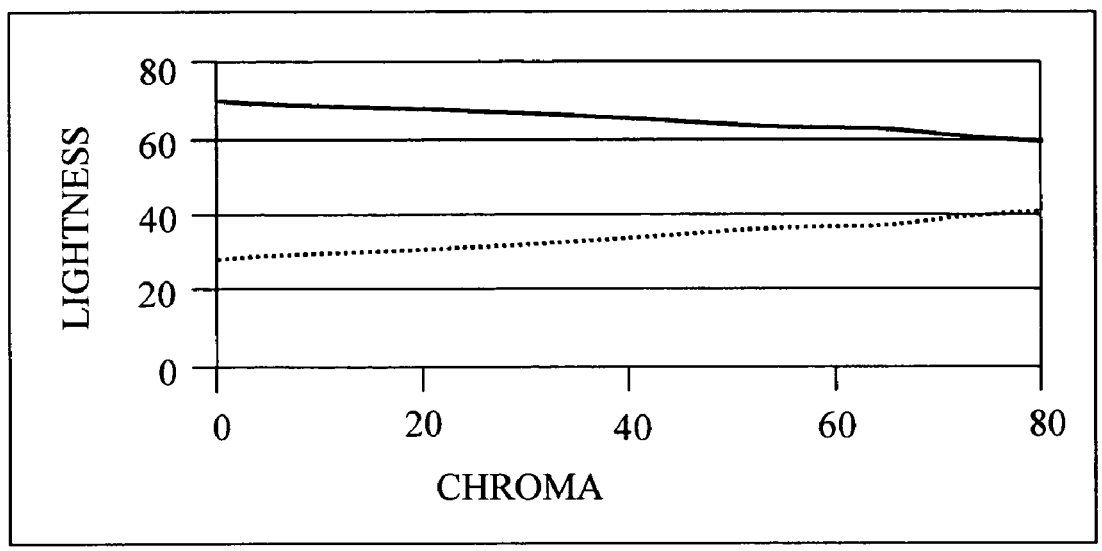
FIG. 16 is a plot depicting the relationship between input chroma and output lightness.

Referring now FIG. 16, a plot depicting the relationship between input chroma and output lightness, i.e., the result of steps S500, S502, S504, and S506, is illustrated.

Referring back to FIG. 4, at step S210, internal chroma mapping is performed.

Internal chroma mapping is performed in order to map the chroma of each point in the internal source gamut 48 to the chroma of each corresponding point in the internal destination gamut 58.

Figure 17:
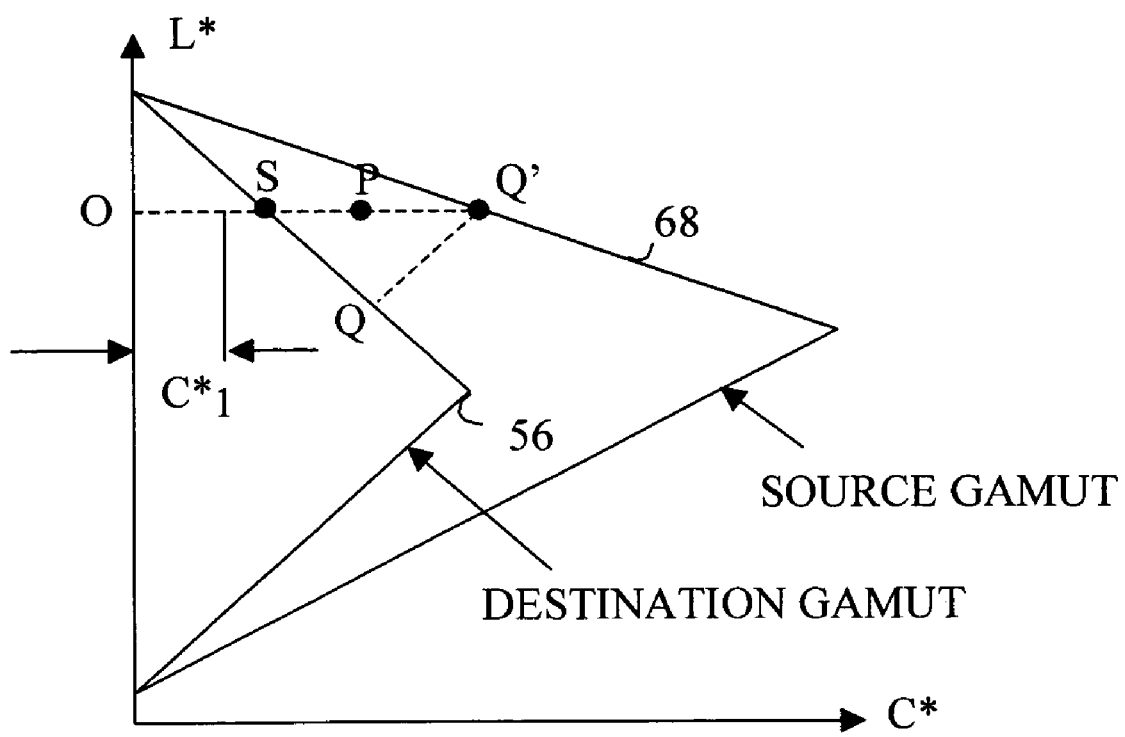
FIG. 17 is depicts a plot illustrating internal chroma mapping.

Referring now to FIG. 17, point Q' on the linear-lightness-scaled source gamut boundary 68 is depicted as having been mapped to point Q on destination gamut boundary 56 according to step S204 and step S206. The chroma, $C^*_{Q'}$, has been mapped as $C^*_Q$. In the following steps the chroma between the point O at the L* axis and the point Q' is mapped into destination gamut boundary 56.

Here, the input x represents chroma in the linear-lightness-scaled source gamut 66, and the output y is the final mapped chroma for destination gamut 44. When x changes from $x_1=C^*_1$ to $x_2=C^*_{Q'}$ (chroma at point Q'), the mapped chroma y will change from $y_1=C^*_1$ to $y_2=C^*_Q$ (final mapped boundary chroma). The final chroma of point P, i.e., with $x=C^*_P$, the chroma at point P in the linear-lightness-scaled source gamut, is determined according to the flowchart of FIG. 18, which describes in greater detail the method of step S210.

Figure 18:
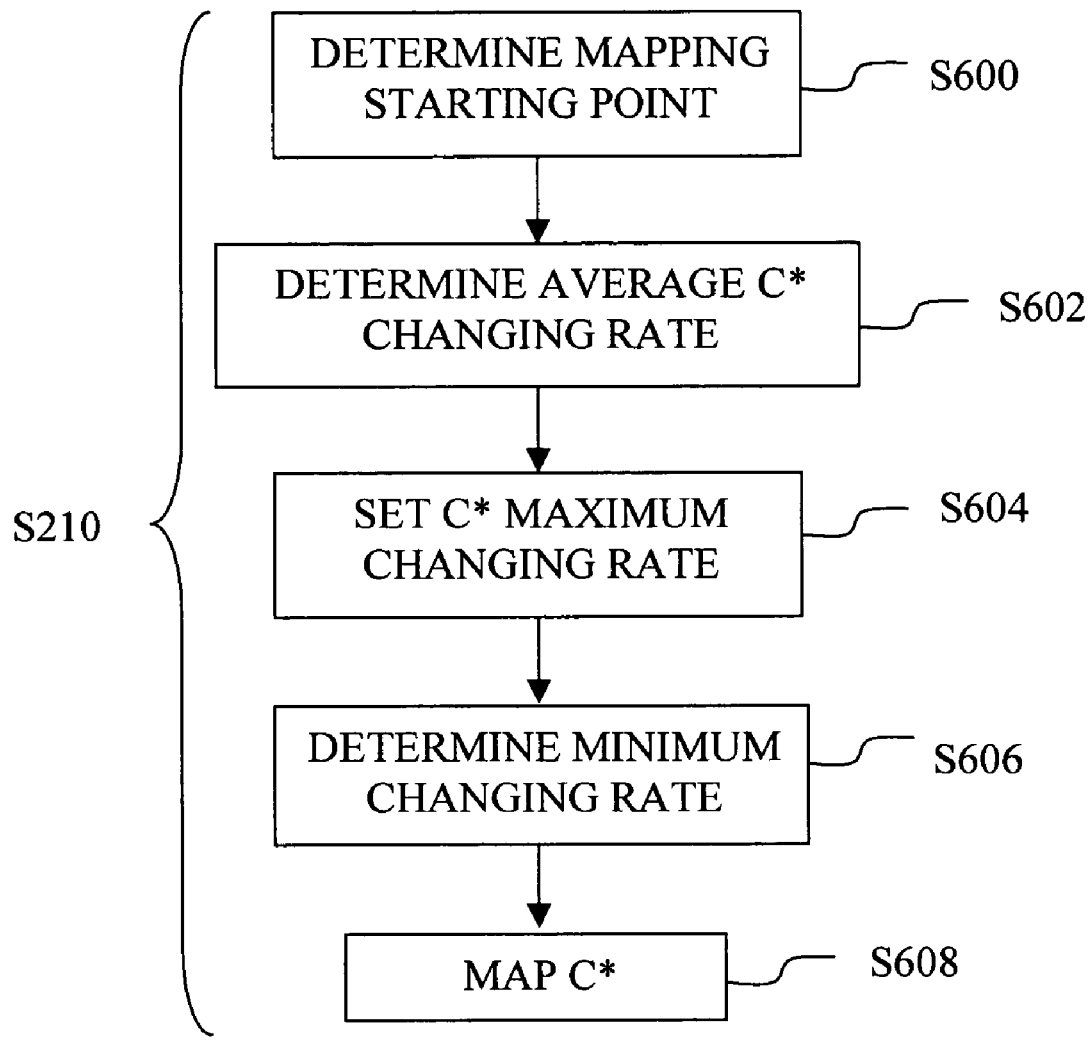
FIG. 18 is a flowchart depicting detailed steps of the FIG. 4 step of determining an internal chroma mapping.

Referring now to FIG. 18, a flowchart depicting detailed steps of determining internal chroma mapping is illustrated. At step S600, the starting point for the mapping is determined. This starting point is that chroma, $C^*_1$, below which no chroma change will be made. In order to preserve more original colors while avoiding color blocking, the start-mapping chroma should be chosen as 70% to 90% of the corresponding destination boundary chroma (O to S in FIG. 17). Based on testing, 80% is selected as a preferable starting point.

At step S602, the average chroma changing rate, $\lambda_a$, is determined with Equation 4.

At step S604, the maximum chroma changing rate, $\lambda_{max}$, between two neighboring points is set as follows:

$$\lambda_{max}=1.5\lambda_a. \qquad \text{Equation 19}$$

At step S606, the minimum changing rate, $\lambda_{min}$, is determined with Equation 16.

At step S608, internal chroma C* is mapped from linear-lightness-scaled source gamut 66 to internal destination gamut 58. The maximum changing rate, $\lambda_{max}$, is assigned to the starting point at $x_1$ if the output boundary chroma, $C^*_{Q'}$, is smaller than the input boundary chroma, $C^*_Q$. Conversely, if the output boundary chroma, $C^*_Q$, is larger than the input boundary chroma, $C^*_{Q'}$, the maximum changing rate is assigned to the ending point at $x_2$. Accordingly, the smaller chroma values will be mapped closer to the input, i.e., the smaller chroma values will be similar to the input chroma values. Then, the final chroma, y, is determined with Equation 9.

Figure 19:
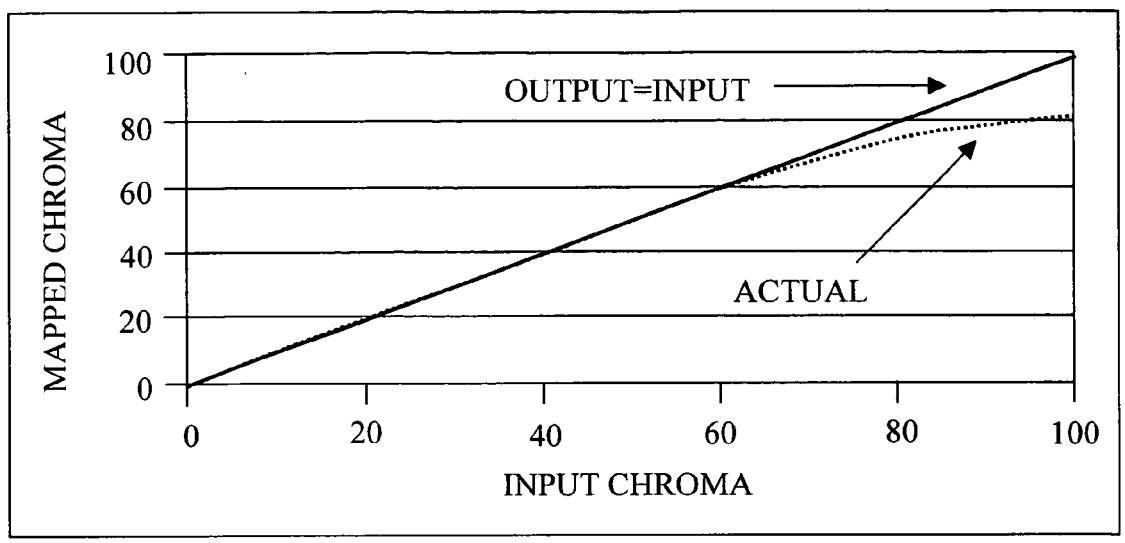
FIG. 19 is a plot depicting mapped chroma at the destination gamut versus input (source gamut) chroma.

Referring now to FIG. 19, the relationship between input and output chroma, i.e., chroma in source gamut 42 and destination gamut 44, respectively, is depicted. It is clear from FIG. 19 that the lower output chroma values, i.e., below approximately 80% of the maximum mapped chroma of approximately 82, thus a mapped chroma of approximately 65 (65/82≈80%) are the same as the input values, thus preserving original color as much as possible. Above this point, the output chroma values smoothly transition to the destination gamut boundary 56 maximum chroma value of approximately 82. If enhanced chroma output is desired, a simple chroma boost method can be first applied to the linear-lightness-scaled source gamut 66, followed by the above-described gamut mapping method. In this way, the output images will appear more colorful.

Referring back to FIG. 4, at step S212, the gamut mapping method described above is applied to generate color reproduction table 40. For each color point in source gamut 42, its mapped L*C*h* are found, and a set of C, M, Y, and K values for destination gamut 44 which together can produce the closest color values to the mapped values of the RGB grid are obtained using an inverted computation process. Because the mapped monitor gamut is the same as the printer gamut, the inverting process is relatively fast. Each of the color points in source gamut 42 and destination gamut 44 are stored in color reproduction table 40, which is later used by imaging apparatus 12 in printing images to reproduce those same images as displayed on display monitor 32 in accordance with the gamut mapping method of the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of mapping a first color gamut to a second color gamut, comprising the steps of:

defining a mapping function establishing a continuous first derivative of change of at least one color space component from said first color gamut to said second color gamut; and applying said mapping function to first color gamut data for said at least one color space component, said applying said mapping function including performing an initial gamut boundary mapping of said first color gamut to said second color gamut, and modifying said initial gamut boundary mapping based on said mapping function, said modified boundary mapping providing boundary mapping of said first color gamut to the second color gamut, wherein said initial gamut boundary mapping comprises:

mapping a first color gamut lightness range to a second color gamut lightness range to generate a linear-lightness-scaled source gamut;

dividing said linear-lightness-scaled source gamut into a first plurality of hue-leafs;

dividing said second color gamut into a second plurality of hue-leafs; and performing minimum error mapping from said linear-lightness-scaled source gamut to said second color gamut by mapping between each hue-leaf of said first plurality of hue-leafs and each of corresponding hue-leafs of said second plurality of hue leafs, wherein said step of performing minimum error mapping is applied to both linear-lightness- scaled source gamut lightness data and linear- lightness-scaled source gamut chroma data, wherein at least one of said defining and said applying is performed by executing instructions stored in a computer-readable storage medium.

2. The method of claim 1, wherein said continuous first derivative is a constant first derivative.

3. The method of claim 1, wherein said continuous first derivative is a linear first derivative.

4. The method of claim 1, wherein said mapping function is further defined by:
   a minimum first derivative of change of said at least one color space component from said first color gamut to said second color gamut; and
   a maximum first derivative of change of said at least one color space component from said first color gamut to said second color gamut.

5. The method of claim 4, wherein:
   said at least one color space component includes a lightness component and a chroma component; and
   said defining said mapping function includes the steps of:
      defining a first function establishing a rate of change of said lightness component for mapping said lightness component from said first color gamut to said second color gamut; and
      defining a second function establishing a rate of change of said chroma component for mapping said chroma component from said first color gamut to said second color gamut.

6. The method of claim 5, wherein said applying step includes:
   applying said first function to first color gamut lightness data; and
   applying said second function to first color gamut chroma data.

7. The method of claim 5, wherein said initial boundary mapping comprises
   determining an initial boundary mapping from a first gamut boundary of said first color gamut to a second gamut boundary of said second color gamut.

8. The method of claim 4, further comprising the steps of:
   determining an internal lightness mapping of said first color gamut to said second color gamut based on said first function; and
   determining an internal chroma mapping of said first color gamut to said second color gamut based on said second function.

9. The method of claim 1, further including the step of generating a color reproduction table based on a result of said applying step.

10. An imaging system comprising a processor and a memory wherein said imaging system employs a color reproduction table, said color reproduction table effecting a continuous first derivative of change of at least one color space component from a first color gamut to a second color gamut, said color reproduction table being configured based on performing an initial gamut boundary mapping of said first color gamut to said second color gamut and modifying said initial gamut boundary mapping using said continuous first derivative of change, said modified boundary mapping providing boundary mapping of said first color gamut to said second color gamut, wherein said initial gamut boundary mapping comprises mapping a first color gamut lightness range to a second color gamut lightness range to generate a linear-lightness-scaled source gamut, dividing said linear-lightness-scaled source gamut into a first plurality of hue-leafs, dividing said second color gamut into a second plurality of hue-leafs, and performing minimum error mapping from said linear-lightness-scaled source gamut to said second color gamut by mapping between each hue-leaf of said first plurality of hue-leafs and each of corresponding hue-leafs of said second plurality of hue leafs, wherein said performing minimum error mapping is applied to both linear-lightness-scaled source gamut lightness data and linear-lightness-scaled source gamut chroma data.

11. The system of claim 10, wherein said continuous first derivative is a constant first derivative.

12. The system of claim 10, wherein said first continuous derivative is a linear first derivative.

13. The system of claim 10, wherein said color reproduction table effects:
   a minimum first derivative of change of said at least one color space component from said first color gamut to said second color gamut; and
   a maximum first derivative of change of said at least one color space component from said first color gamut to said second color gamut.

14. The system of claim 10, wherein said at least one color space component includes a lightness component and a chroma component, said color reproduction table effecting a first function for mapping said lightness component from said first color gamut to said second color gamut, and a second function for mapping said chroma component from said first color gamut to said second color gamut.

15. The system of claim 14, wherein:
   said initial gamut boundary mapping is determined from a first gamut boundary of said first color gamut to a second gamut boundary of said second color gamut; and
   said initial gamut boundary mapping is modified based on said first function and said second function.

16. The system of claim 14, said color reproduction table effecting:
   an internal lightness mapping of an internal lightness component of said first color gamut to an internal lightness component of said second color gamut based on said first function; and
   an internal chroma mapping of an internal chroma component of said first color gamut to an internal chroma component of said second color gamut based on said second function.

17. A method of mapping a first color gamut to a second color gamut, comprising the steps of:
   determining an initial boundary mapping from a first gamut boundary of said first color gamut to a second gamut boundary of said second color gamut, wherein determining an initial boundary mapping comprises:
      mapping a first color gamut lightness range to a second color gamut lightness range to generate a linear-lightness-scaled source gamut;
      dividing said linear-lightness-scaled source gamut into a first plurality of hue-leafs;
      dividing said second color gamut into a second plurality of hue-leafs, and
      performing minimum error mapping from said linear-lightness-scaled source gamut to said second color gamut by mapping between each hue-leaf of said first plurality of hue-leafs and each of corresponding hue-leafs of said second plurality of hue leafs, wherein said performing minimum error mapping is applied to both linear-lightness scaled source gamut lightness data and linear- lightness- scaled source gamut chroma data;
   modifying said initial boundary mapping based on a general color change control scheme that maintains a continuous first derivative of change of lightness and chroma between said first color gamut and said second color gamut;

determining an internal lightness mapping of a lightness component of said first color gamut to a lightness component of said second color gamut based on said general color change control scheme; and determining an internal chroma mapping of a chroma component of said first color gamut to a chroma component of said second color gamut based on said general color change control scheme, wherein at least one of said determining said initial boundary mapping, said modifying said initial boundary mapping, said determining said internal lightness mapping and said determining said internal chroma mapping is performed by executing instructions stored in a computer-readable storage medium.

18. The method of claim 17, wherein said continuous first derivative is one of a constant first derivative and a linear first derivative.

19. The method of claim 17, wherein said method is used to generate a color reproduction table.

20. A method of mapping a first color gamut to a second color gamut, comprising the steps of:

determining an initial boundary mapping from a first gamut boundary of the first color gamut to a second gamut boundary of the second color gamut, wherein the determining step includes:

mapping a first color gamut lightness range to a second color gamut lightness range to generate a linear-lightness-scaled source gamut;

dividing said linear-lightness-scaled source gamut into a first plurality of hue-leafs;

dividing said second color gamut into a second plurality of hue-leafs; and performing mapping from said linear-lightness-scaled source gamut to said second color gamut by mapping between each hue-leaf of said first plurality of hue-leafs and each of corresponding hue-leafs of said second plurality of hue leafs, wherein said mapping is applied to both linear-lightness scaled source gamut lightness data and linear-lightness-scaled source gamut chroma data; and modifying said initial boundary mapping based on a mapping function, wherein at least one of said defining and said modifying is performed by executing instructions stored in a computer-readable storage medium.

21. The method of claim 20 wherein the mapping function establishes a continuous first derivative of change of at least one color space component from the first color gamut to the second color gamut.

22. The method of claim 20, wherein said mapping function is further defined by:

a minimum first derivative of change of said at least one color space component from said first color gamut to said second color gamut; and a maximum first derivative of change of said at least one color space component from said first color gamut to said second color gamut.

23. The method of claim 22, wherein:

said at least one color space component includes a lightness component and a chroma component; and said defining said mapping function includes the steps of:

defining a first function establishing a rate of change of said lightness component for mapping said lightness component from said first color gamut to said second color gamut; and defining a second function establishing a rate of change of said chroma component for mapping said chroma component from said first color gamut to said second color gamut.

24. The method of claim 23, further comprising the steps of:

determining an internal lightness mapping of an internal lightness component of said first color gamut to an internal lightness component of said second color gamut based on said first function; and determining an internal chroma mapping of an internal chroma component of said first color gamut to an internal chroma component of said second color gamut based on said second function.

* * * * *